US 6,623,652 B1

(12) United States Patent
Hsiao et al.

(10) Patent No.: US 6,623,652 B1
(45) Date of Patent: Sep. 23, 2003

(54) REACTIVE ION ETCHING OF THE LAPPED TRAILING EDGE SURFACE OF A SLIDER

(75) Inventors: Richard Hsiao, San Jose, CA (US);
Cherngye Hwang, San Jose, CA (US);
Hugo Alberto Emilio Santini, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 09/593,348

(22) Filed: Jun. 14, 2000

(51) Int. Cl.⁷ ............................................... G11B 5/127
(52) U.S. Cl. ........................... 216/22; 216/67; 216/72; 216/80; 29/603.07
(58) Field of Search ............................... 216/11, 22, 38, 216/52, 57, 63, 67, 72, 75, 79, 80; 29/603.01, 603.07, 603.12

(56) References Cited

U.S. PATENT DOCUMENTS

| | | | |
|---|---|---|---|
| 4,139,442 A | 2/1979 | Bondur et al. | 204/192 |
| 4,214,946 A | 7/1980 | Forget et al. | 146/643 |
| 4,855,854 A | 8/1989 | Wada et al. | 360/126 |
| 4,893,203 A | 1/1990 | Ezaki et al. | 360/103 |
| 5,146,379 A | 9/1992 | Iwata et al. | 360/126 |
| 5,198,934 A | 3/1993 | Kubo et al. | 360/104 |
| 5,271,802 A | 12/1993 | Chang et al. | 156/643 |
| 5,323,283 A | 6/1994 | Sano | 360/103 |
| 5,635,082 A | 6/1997 | Yamamoto et al. | 216/22 |
| 5,652,687 A | 7/1997 | Chen et al. | 360/126 |
| 5,687,045 A | 11/1997 | Okai et al. | 360/126 |
| 5,861,103 A | 1/1999 | Yamazaki et al. | 216/66 |
| 5,985,163 A | * 11/1999 | Cha et al. | 216/22 |

FOREIGN PATENT DOCUMENTS

JP        60136025        7/1985

OTHER PUBLICATIONS

Abstract : RD338049 (Research Disclosure), Anonymous, May 20, 1992 Derwent WPI Acc No: 92–224251/199227.

* cited by examiner

*Primary Examiner*—Allan Olsen
(74) *Attorney, Agent, or Firm*—Robert B. Martin; Bracewell & Patterson, L.L.P.

(57) ABSTRACT

A method of altering the topography of a trailing edge or ABS of a slider is disclosed, the slider having a substrate surface, at least one magnetic recording head on top of the alumina, and an overcoat of a material, preferably $SiO_2$. The steps include first applying an $SiO_2$ overcoat at the wafer level followed by slicing the wafer into rows, then lapping the rows. The rows are then placed on a bias electrode, exposing the trailing edge to a plasma generated from a controlled source in a reactive ion etching process. The plasma is generated using an chemical etchant such as $CHF_3$ and other F-containing compounds, the plasma being generated with a combination of an inert gas such as Argon and the chemical etchant. In the plasma, the electrode is charged to accelerate the plasma ions towards the exposed surface. Reacted material is drawn from the surface of the slider. The $SiO_2$ trailing edge reacts preferentially with the plasma, thus effectuating a change in the trailing edge topography.

1 Claim, 7 Drawing Sheets

REACTIVE ION ETCHING OF THE LAPPED TRAILING EDGE SURFACE OF A SLIDER

BACKGROUND OF THE INVENTION

1. Technical Field

The present invention relates in general to an improved method for manufacturing sliders for magnetic recording heads, and in particular to the reactive ion etching (RIE) of the air-bearing surface (ABS) and/or trailing edge of the slider. Still more particularly, the present invention relates to the use of RIE over the entire slider or with the slider masked in order to change the topography of the trailing edge and remove protrusions that cause head crash.

2. Description of the Related Art

Digital magnetic recording devices for data storage generally comprise a thin film magnetic recording disk and a head which is moved above the surface of the rotating disk to electromagnetically read and write information on the disk. Advanced thin film magnetic recording disks generally comprise a rigid substrate, a magnetic layer such as a cobalt-based metal alloy, a protective amorphous carbon layer and a lubricant layer, such as perfluoropolyether disposed on the carbon overcoat.

During operation of the disk drive system, an actuator mechanism moves the magnetic transducer to a desired radial position on the surface of the rotating disk where the head electromagnetically reads or writes data. Usually, the head is integrally mounted in a carrier or support referred to as a "slider". The slider is generally rectangular in shape and consists of two portions: a substrate portion and a head portion formed on an end face of the slider portion. Typically, this end face of the slider will constitute the slider trailing edge when the slider is suspended adjacent to a rotating recording disk.

The substrate portion of the slider can be made from ceramic material such as $Al_2O_3/TiC$, silicon carbide, zirconium oxide, or other suitable material. The head portion of the slider is typically a thin layer of alumina ($Al_2O_3$), or alumina overcoat, formed on the trailing edge face of the slider in which the magnetic portion of the head is embedded. Head elements such as poletips and shields and MR heads are imbedded into the head, these elements being made from metals and/or alloys of metals such as NiFe. The slider generally serves to mechanically support the head and any electrical connections between the head and the rest of the disk drive system. The slider is aerodynamically shaped to glide over moving air in order to maintain a uniform distance from the surface of the rotating disk, thereby preventing the head from undesirable contacting the disk.

Typically, a slider is formed with an aerodynamic pattern of protrusions (air bearing design) on its air bearing surface ("ABS"), or substrate surface, which enables the slider to fly at a constant height close to the disk during operation of the disk drive. The recording density of the magnetic disk drive system is dependent upon the distance between a transducer and the magnetic media. One goal of the air bearing slider design is to "fly" a slider as closely as possible to a magnetic medium while avoiding physical impact with the medium. Smaller spacings, or "fly heights", are desired so that the transducer can distinguish between the varying magnetic fields emanating from closely spaced regions on the disk.

However, the benefit of closer spacing is contrasted by the adverse effect on the mechanical reliability of the slider. As the distance between the slider and the disk decreases, as it does with every generation of storage device, the probability of contact between the two surfaces increases, thus leading to unreliable data transfer and head crashing. The probability of contact between the slider and disk increases when any part of the trailing edge protrudes above the air bearing surface of the slider. Ideally, the read elements should be flush with the alumina material making up the slider surface. Thus, the precise topography surrounding the transducers is vital to the performance of the slider read/write head.

The trailing edge topography of a slider depends upon the lapping process and the overcoat material used. Furthermore, the heating of the head during operation causes thermal expansion of the organic insulation material in the head. This thermal expansion will cause a protrusion of overcoat material beyond the air bearing surface. It is not uncommon for an undesirable protrusion to be present when the head is flying over a disk. Since the protrusion is known to be detrimental to the operation of low-fly gliders, it would be beneficial to tailor the trailing edge profile to any defined shape.

The prior art discloses a general method of using Reactive Ion Etching (RIE), wherein some substrate is exposed to a reactive plasma in order to react the substrate surface species with the plasma and effectuate removal of the surface species. For example, Hsiao et al, Electrochemical Society Proceedings, Vol. 96, No. 12 (1996) shows that RIE plasmas will react with $SiO_2$ differentially relative to $Al_2O_3$. However, no method of altering the topography of a slider using RIE is known in the art. The present invention is directed towards such means of tailoring a trailing edge profile through the use of RIE, in particular when $SiO_2$ is used as an overcoat on the slider and alumina ($Al_2O_3$) is the undercoat.

SUMMARY OF THE INVENTION

It is therefore one object of the present invention to provide a method of altering the topography of the ABS or trailing edge of a slider or wafer of sliders, and/or to remove protrusions on the slider trailing edge.

It is another object of the present invention to provide a method of decreasing the likelihood of physical contact between a moving disk and the magnetic recording heads of the slider by providing an improved slider.

It is yet another object of the present invention to improve the thermal asperity characteristics of the magnetic recording heads of a slider.

It is yet another object of the present invention to provide for a process of selectively removing the $SiO_2$ overcoat on a slider ABS.

The foregoing objects are achieved as is now described, wherein reactive ion etching (RIE) of low bombardment energy is used to alter the topography of a ABS or trailing edge of a slider or row of sliders, the slider having a substrate surface, at least one magnetic recording head imbedded in an $SiO_2$ overcoat, and a vertical axis relative to the substrate surface. The steps include first applying a $SiO_2$ overcoat at the wafer level to form the $SiO_2$ trailing edge at the slider level. Following this step, the wafers are sliced into rows containing multiple sliders. Next, the rows are lapped. The rows are then placed on an electrode pallet, exposing the ABS or trailing edge to a plasma. The plasma is generated using an etchant gas such as a fluorine compound, e.g. $SF_6$, $CF_4$, etc., in combination with Argon and/or other etchant gases. The trailing edge (or trailing edges) are then exposed at least once to the RIE plasma for a predetermined time. The RIE angle is typically about 90°.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
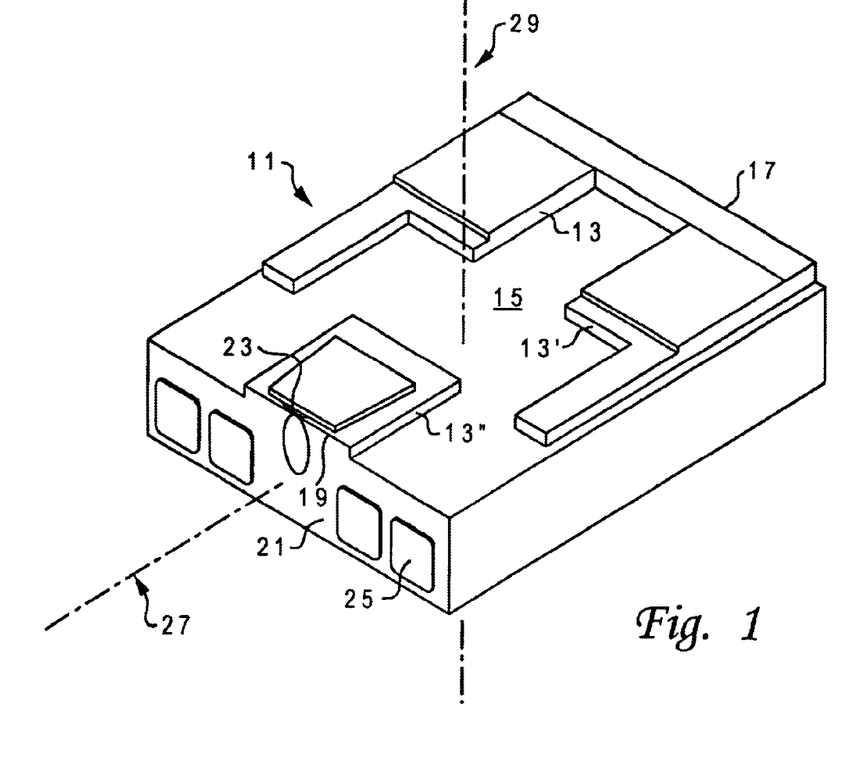
FIG. 1 depicts details of a finished slider in accordance with a preferred embodiment of the present invention.

With reference now to the figures, and in particular with reference to FIG. 1, there is shown a typical finished thin film head slider 11 with a negative pressure ABS. The slider 11 is generally rectangular in shape and has a complex topography. It consists of two portions: a substrate portion and a head portion, the head being formed on an end face of the slider portion. Typically, this end face of the slider constitutes the slider trailing surface when the slider is suspended adjacent to a rotating recording disk.

The substrate portion of the slider, which constitutes the bulk of the finished thin film head slider 11, is typically made of a ceramic material such as $Al_2O_3$—TiC or other suitable material. The substrate surface 15 is the surface on which most of the various features of the slider are located. In one embodiment shown in FIG. 1, the slider comprises, as shown, three dual-depth step pads 13, 13', and 13" disposed on a recessed substrate surface 15 of the finished slider 11. The two step pads are at the leading edge 17 and one is at the trailing edge 19. The features 13, 13', 13" and 15 constitute the ABS of the present embodiment of a slider. The trailing edge 19 is located on the edge of the substrate surface 15, adjacent to the deposited end 21. Magnetic materials and alumina are deposited on the end 21. The head 23 is suitably located on the single step pad 13" near the deposited end 21 of the slider 11. The head 23 is composed of various subparts described in more detail in FIGS. 3 and 4.

Referring back to FIG. 1, the step pads 13, 13' and 13" and the substrate surface 15, the surface 15 being recessed relative to the step pads, are all structural features which enable the head 23 to glide or "fly" at a short distance above the surface of a rotating magnetic disk. A variety of other ABS designs are know in the art, which as disclosed in U.S. Pat. No. 5,650,893 (for negative pressure design) and U.S. Pat. No. 4,894,740 (for positive pressure design), the disclosures of which are incorporated herein by reference.

Referring still to FIG. 1, the head 23 is typically formed in a thin layer of alumina deposited on the trailing edge 19 of the slider. Suitably, the subparts of the head 23 are magnetoresistive read elements and an inductive element for writing data. Electrical terminal pads 25 provide electrical connection for the magnetic head elements. Further, the slider 11 has a vertical axis 29 relative to the substrate surface 15 and a horizontal axis 27 that is perpendicular to the axis 29.

The present invention is directed towards altering the topography of a slider surface, the slider typically being part of a row of sliders. The basic steps in the process are to first provide a wafer of sliders having the read elements, etc. The method of making the head elements shields, poletips, read elements is well known in the art. Hereinafter, shields, poletips, read heads and other electrical/magnetic components on the trailing edge may be referred to as "head elements", unless specificity is otherwise required. The sliders comprise at least an undercoat made of materials such as $Al_2O_3$. An overcoat of another material such as $SiO_2$ or other desirable material is then applied to the slider by methods common in the art. Next, the sliders are blocked and shaped by lapping to form the ABS.

The method of the present invention is carried out after lapping in order to further refine the topography to the desired conformation. Further, there can be protrusions in the ABS, and particularly in the trailing edge of the slider, that cause head crashing at low flight heights. These protrusions are due to the lapping process and other causes. Although the desired topography of the trailing edge will depend upon the ultimate end use of the slider, having protrusions is typically undesirable.

Figure 2:
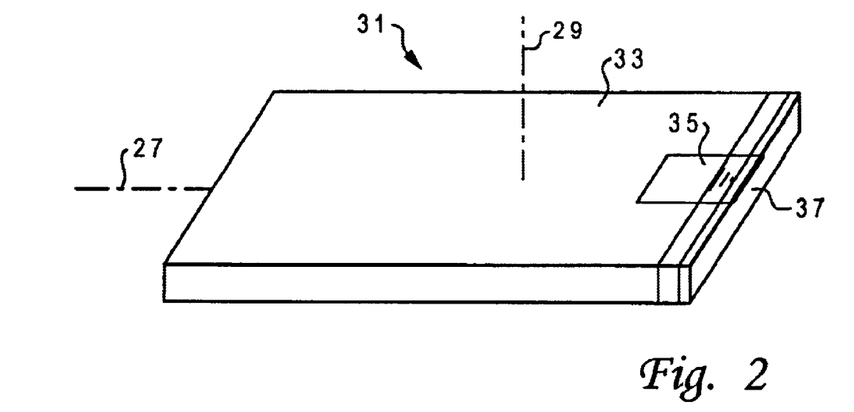
FIG. 2 is a stylized perspective view of an unfinished slider prior to lapping and RIE.
Figure 3:
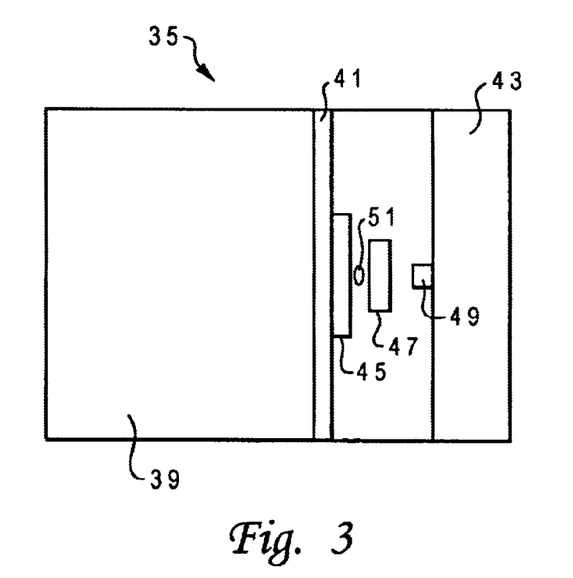
FIG. 3 is a top, closeup view of the head region of the slider in FIG. 2.
Figure 4:
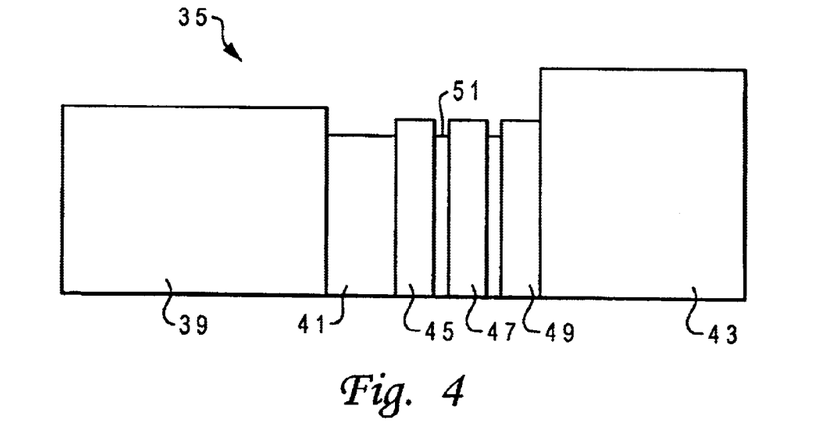
FIG. 4 is a cross-sectional view of the head region of the slider in FIG. 3.

The detailed topography of the head region of a slider is shown with reference to FIGS. 2–4. Referring to FIGS. 2–4, the topography of the slider is characterized by raised and depressed regions on the head 35 of slider 31. The head region 35 is adjacent to the trailing edge 37 of the slider. The head region 35 is made from layers of differing materials as shown in cross section in FIG. 4. The substrate section 39 is continuous with the substrate surface 33 in the present embodiment and is made from $Al_2O_3$—TiC, while having an alumina ($Al_2O_3$) undercoat 41 (UC) and $SiO_2$ overcoat 43 (OC). As an example, a layer of $SiO_2$ of, for example, 20 $\mu$m thickness, is formed over the substrate of a slider, the SiO$_2$ layer being typically an overcoat at the trailing edge of the slider. RIE can be performed directly on an unmasked slider.

As stated above, the head 35 is composed of various subparts. These subparts are as follows in the embodiment shown in FIGS. 2–4: between the layers 41 and 43 are the shield 1 or "S1" (45), shield 2/poletip 1 or "S2/P1" (47), and poletip 2 or "P2" (49). Finally, read head 51 is typically located between S1 and S2. The shields, poletip and read head may be made from such materials as Fe, Ni or other metals and alloys. The method of layering these materials into a slider and head are well known in the art, and the invention is not limited to a particular type and pole or shield material.

The present invention is a method of selectively removing certain portions of a slider, trailing edge. The method of removing the portions or materials from the slider in the present invention is reactive ion etching (RIE). Conventionally, RIE is known as an anisotropic dry etching method whereby a plasma of ions and neutral radical species that are highly reactive are generated that selectively react with certain compounds on the slider surface. In RIE, a sample to be etched, in the present invention rows of sliders are placed on a bias electrode to which a high frequency power supply is connected. The bias-power source controls the voltage across the electrode. In one embodiment of a RIE apparatus, the electrode and sample is in a chamber, the chamber containing a plasma that is generated from gases injected into the chamber and reaction product gases that can be drawn out of the chamber in a controlled manner. The electrode or electrodes are held within a chamber having at least one inlet and one outlet, wherein gas can be added to the chamber from the inlet and gas can be expelled or drawn out from the outlet. Further, the inlet and outlet is arranged such that the pressure within the chamber can be controlled.

The chemical etchant used in RIE is usually in combination with some inert gas such as Ar, and the amount of the etchant gas (chemical etchant) can be varied any where from between 50% to 100%. The chemical etchant is typically a F-containing compound selected from a group consisting of $CF_4$, $SF_6$, $CHF_3$, $C_3F_6$, $C_4F_8$, and $NF_3$. The pressure within the chamber can be varied by standard means known to those skilled in the art, and is typically between 1 mtorr to 10 mtorr to effectuate the etching process. The bias power, which is the power applied to the bias electrode, can generally be between 0 and 150 W (Watts). The source power, which is the power used to generate ions within the chamber using a filament or coils, can typically vary between 50 and 600 Watts. Typical examples of the RIE process are disclosed in U.S. Pat. No. 4,139,442, U.S. Pat. No. 4,214,946, and U.S. Pat. No. 5,861,103.

The RIE method of the present invention can be used without a mask to effectuate the selective etching of one material over another. Typically, SiO$_2$ is selectively etched to a greater extent than, for example, Al$_2$O$_3$. In the RIE process, the reactive ions and neutral radical species that are generated as described above react with the SiO$_2$ on the surface of the slider thus producing, for example, SiF$_4$ gas, which can then be drawn out of the chamber to effectuate further removal of the SiO$_2$. To etch the surface of a sample, such as a row of sliders, an RF exciting coil or other apparatus around the chamber is activated with a source power supply to excite the chemical etchant thereby dissociating an atom of halogen (typically F) from the chemical etchant and forming various positive and negative ions and neutral reactive species such as, for example, SF$_5$· and F· from SF$_6$, or, in general, $SF_{(6-x)}$ and xF species and $CF_{(4-x)}$ and xF species. The dissociated ions and neutrals then chemically interact with the surface to be etched, producing various gases as a reaction product.

The method of altering the trailing edge or ABS topography of the lapped slider using RIE, and in particular a surface of a slider, is described with reference to FIGS. 5A–5B. The embodiment of slider 35, cutaway side view, shows the substrate 39, overcoat 43, ABS 55, Al$_2$O$_3$ undercoat 59, and head subparts grouped together as head elements 53. The head elements 53 are a combination of, for example, the shields and poles 45, 47, 49, and 51 of FIGS. 3 and 4. Referring back to FIGS. 5A–5B is also shown trailing edge 57.

Figure 5A:
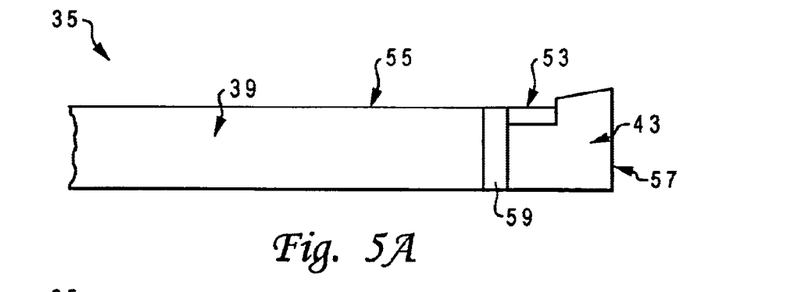
FIG. 5A is a side, cutaway view of a slider showing a protrusion on the trailing edge.
Figure 5B:
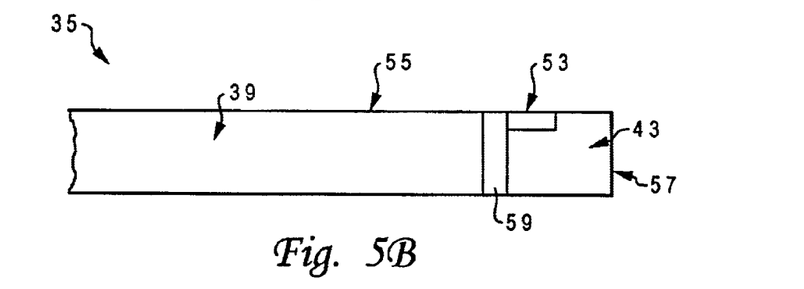
FIG. 5B is the same slider as in FIG. 5A, wherein the trailing edge has been selectively etched using RIE.

FIG. 5A shows the trailing edge 57 with a protrusion, the protrusion is beyond the head elements 53, thus creating a head crash problem. Exposing the trailing edge and ABS to the plasma generated by RIE process can selectively etch away this protrusion and better define the trailing edge, ABS, and the head elements. FIG. 5B shows the results of a RIE process on the slider in FIG. 5A, wherein the trailing edge 57 is preferentially etched away, the material being reacted with the plasma and drawn away. What is left is a smooth surface without protrusions that is substantially level with the read elements.

In the preferred embodiment of the invention, the overcoat 43 is SiO$_2$ material, while the substrate 39 is Al$_2$O$_3$/TiC material and the undercoat 41 is Al$_2$O$_3$. In the preferred embodiment, the RIE plasma etches away the trailing edge material, and hence, the protrusion in FIG. 5A. This is accomplished by the selective effect the plasma has upon the various substrate surface species, wherein SiO$_2$ is etched at a faster rate than the Al$_2$O$_3$. Further, the products of the reaction are then drawn from the surface and the chamber, thus allowing the material below the first reacted surface layers of materials to react with the plasma to be etched away. The more the surface is exposed over time to the plasma, the larger amount of material can be etched away and the greater the change in topography of the slider trailing edge.

Figure 6:
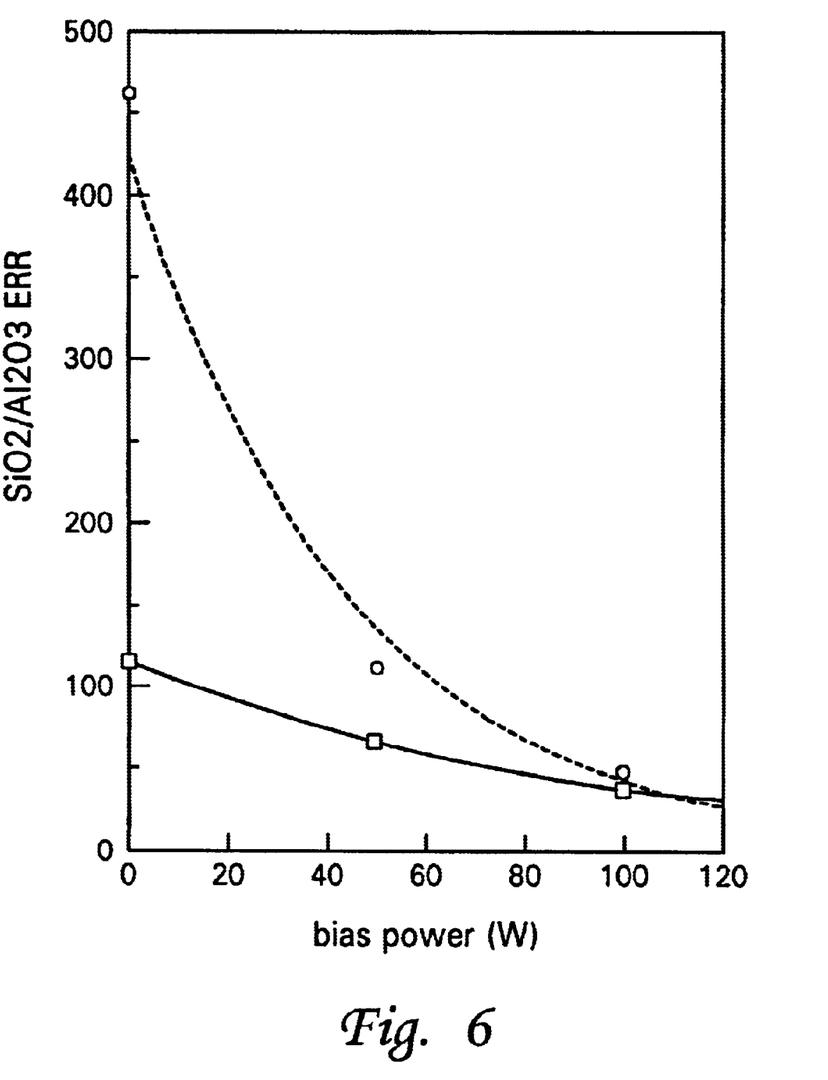
FIG. 6 is a graphical representation of data showing the effect of bias power (W) on the etch rate of $SiO_2$ relative to $Al_2O_3$.
Figure 7A:
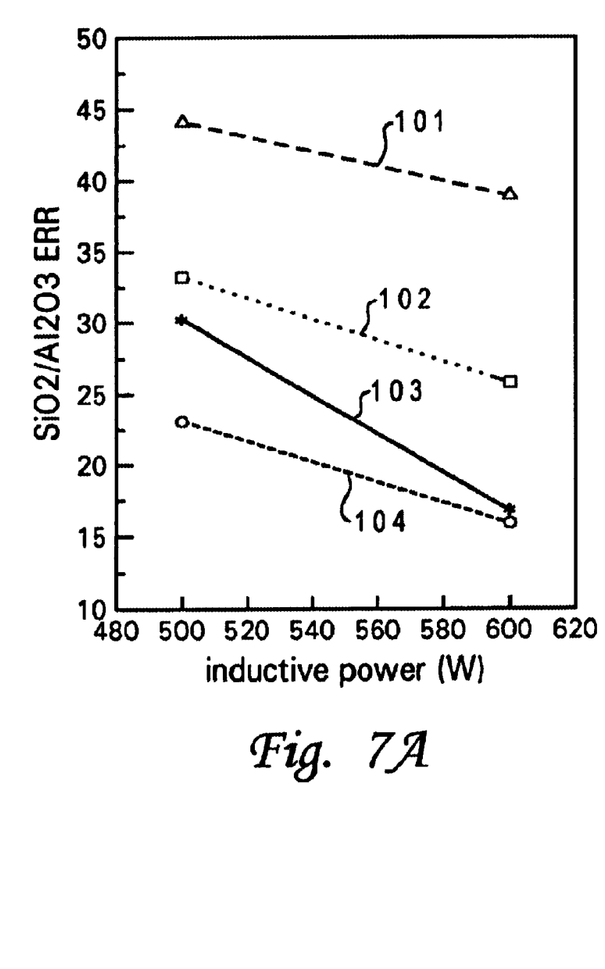
FIG. 7A is a graphical representation of data showing the effect of a $CF_4$ plasma upon the relative $SiO_2/Al_2O_3$ etch rate wherein the inductive power of the source is varied.
Figure 7B:
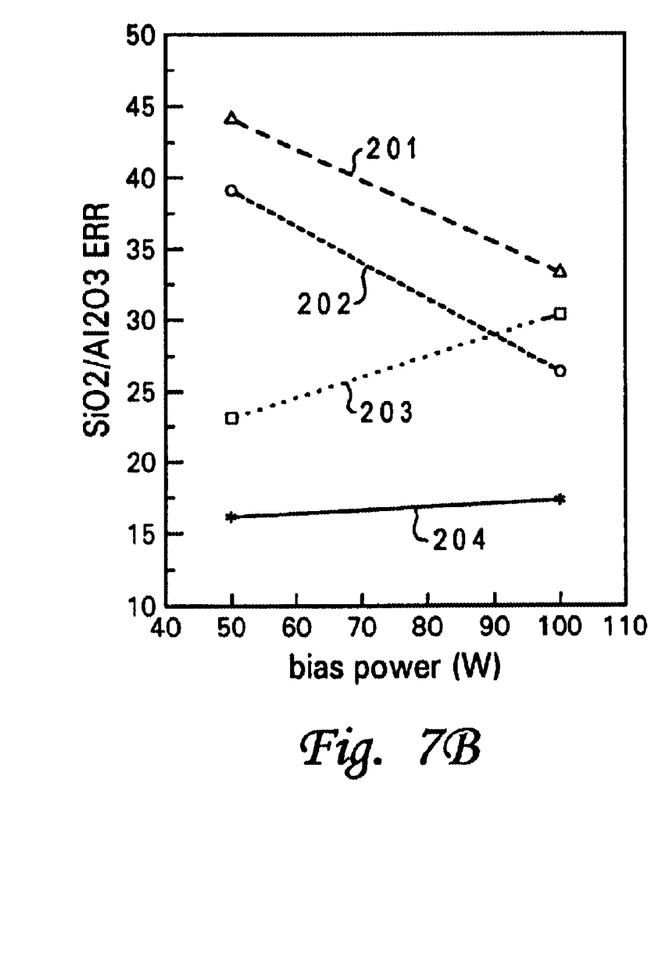
FIG. 7B is a graphical representation of data showing the effect of the bias power on the electrode as a function of the relative $SiO_2/Al_2O_3$ etch rate in a $CF_4$ plasma.
Figure 7C:
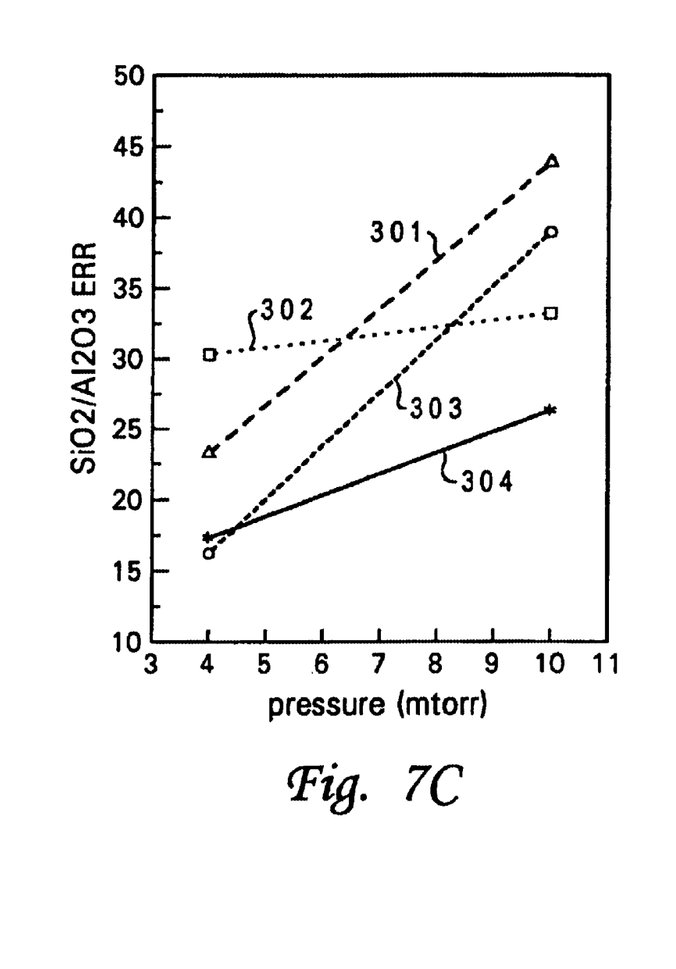
FIG. 7C is a graphical representation of data showing the effect of gas pressure in the plasma as a function of the relative $SiO_2/Al_2O_3$ etch rate in a $CF_4$ plasma.
Figure 8A:
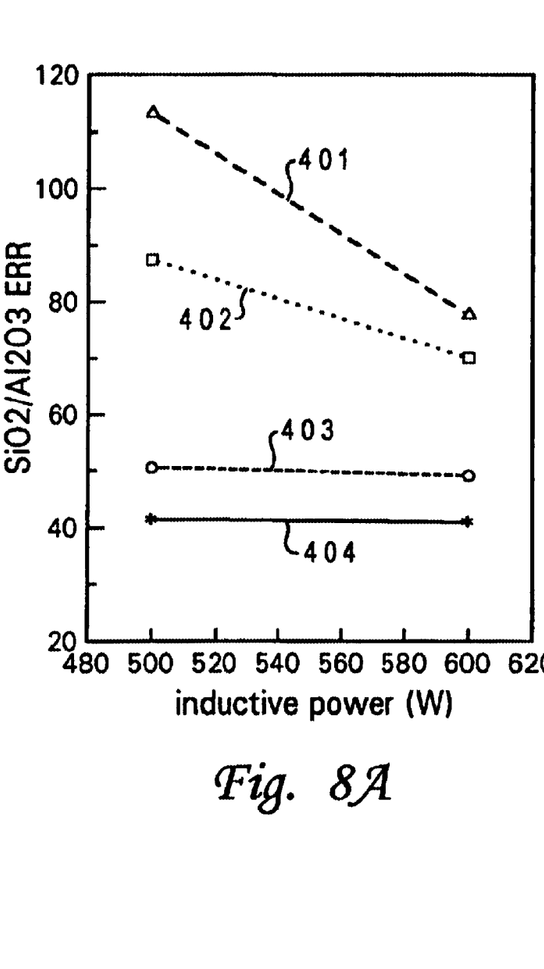
FIG. 8A is a graphical representation of data showing the effect a $SF_6$ plasma upon the relative $SiO_2/Al_2O_3$ etch rate wherein the inductive power of the source is varied.
Figure 8B:
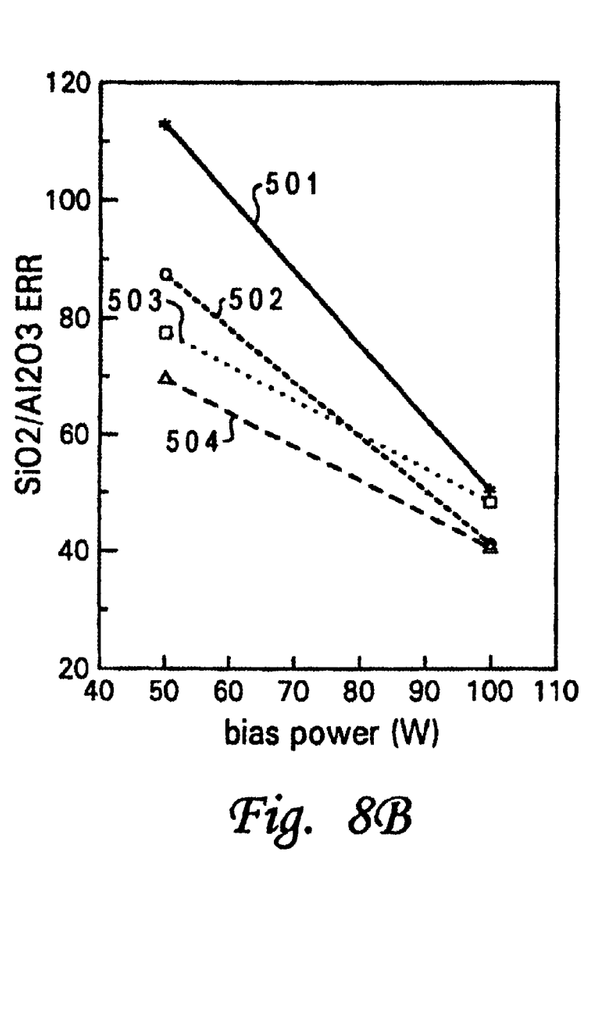
FIG. 8B is a graphical representation of data showing the effect of the bias power on the electrode as a function of the relative $SiO_2/Al_2O_3$ etch rate in a $SF_6$ plasma.
Figure 8C:
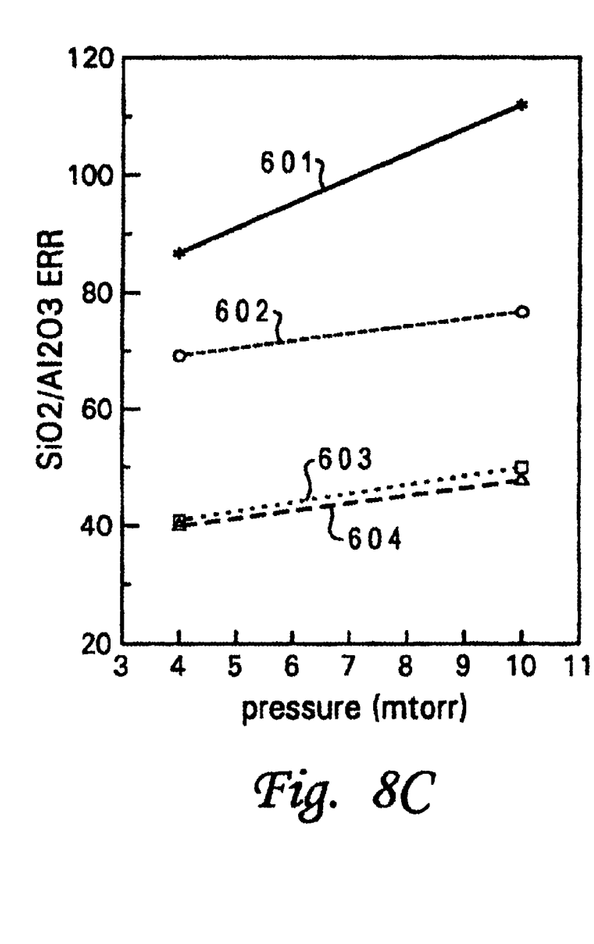
FIG. 8C is a graphical representation of data showing the effect of gas pressure in the plasma as a function of the relative $SiO_2/Al_2O_3$ etch rate in a $SF_6$ plasma.

The use of different materials having varying degrees of susceptibility to the RIE process is used to vary the topography of the slider. Further, variations in other parameters will also influence the etch rate and topography of the slider AIBS or trailing edge, as shown in the data of FIGS. 6–8. For example, varying the bias power of the electrode surface upon which the slider or row rests will alter the relative etch rate of slider materials. The data in FIG. 6 shows how varying the bias power alters the etch rate as expressed in a ratio of SiO$_2$/Al$_2$O$_3$, the SiO$_2$ being etched at a greater rate relative to the Al$_2$O$_3$. The data in FIG. 6 show results at a source power of 600 W at a chamber pressure of 4 mtorr (dark squares), and a source power of 500 W at a chamber pressure of 10 mtorr (open circles). These data show that the relative etch rate is greatest at low bias power in general, and specifically, the etch rate is greatest when higher pressure is used.

The change in topography of a slider trailing edge in a CF$_4$ plasma is shown with reference to the data in FIGS. 7A–7C, wherein various parameters are altered to affect the relative etching of SiO$_2$ with respect to Al$_2$O$_3$. The influence of source power (inductive power) is shown in FIG. 7A, wherein the data in line 101 is at a bias power of 50 W, and chamber pressure of 10 mtorr; the data in line 102 is at a bias power of 100 W and chamber pressure of 10 mtorr; the data in line 103 is at a bias power of 100 W and a chamber pressure of 4 mtorr; and the data in line 104 is at a bias power of 50 W and a chamber pressure of 4 mtorr.

In a CF$_4$ plasma, the effect of bias power on the etch rate is show with respect to FIG. 7B, wherein the data in line 201 is at 500 W source power and a chamber pressure of 10 mtorr; the data in line 202 is at 600 W source power and a chamber pressure of 10 mtorr; the data in line 203 is at 500 W source power and a chamber pressure of 4 mtorr; and the data in line 204 is at a source power of 600 W and a chamber pressure of 4 mtorr.

Finally, the influence of the chamber pressure is shown graphically in FIG. 7C for a $CF_4$ plasma. The data in line 301 are at a source power of 500 W and a bias power of 50 W; the data in line 302 are at a source power of 500 W and a bias power of 100 W; the data in line 303 is at a source power of 600 W and a bias power of 50 W; and the data in line 304 is at a source power of 600 W and a bias power of 100 W. The data in FIGS. 7A–7C demonstrate that, in $CF_4$ plasma, the $SiO_2/Al_2O_3$ etch rate can be increased by increasing the chamber pressure and decreasing the source power. Overall, decreasing the bias power also increases the etch rate.

The effect of a $SF_6$ plasma upon the relative etch rate of $SiO_2/Al_2O_3$ is shown with respect to FIGS. 8A–8C. Specifically, the effect of a change in the source power (inductive power) is shown in FIG. 8A, wherein the data in line 401 is at a bias power of 50 W and a chamber pressure of 10 mtorr; the data in line 402 is at a bias power of 50 W and a chamber pressure of 4 mtorr; the data in line 403 is at a bias power of 100 W and chamber pressure of 10 mtorr; and the data in line 404 is at a bias power of 100 W and a chamber pressure of 4 mtorr.

The effect of a change in the bias power on a $SF_6$ plasma is shown with respect to FIG. 8B, wherein the data in line 501 is at a source power of 500 W and a chamber pressure of 10 mtorr; the data in line 502 is at a source power of 500 W and a chamber pressure of 4 mtorr; the data in line 503 is at a source power of 600 W and a chamber pressure of 10 mtorr; and the data in line 504 is at a source power of 600 W and a chamber pressure of 4 mtorr.

The effect of a change in the chamber pressure on a $SF_6$ plasma is shown with respect to FIG. 8C, wherein the data in line 601 is at a source power of 500 W and a bias power of 50 W; the data in line 602 is at a source power of 600 W and a bias power of 50 W; the data in line 603 is at a source power of 500 W and a bias power of 100 W; and the data in line 604 is at a source power of 600 W and a bias power of 100 W. These data in FIGS. 8A–8C demonstrate that a decrease in the source power increases the relative etch rate, a decrease in the bias power sharply increases the relative etch rate, and an increase in pressure increases the relative etch rate. Further, the differences between the data in FIGS. 7A–7C and the data in FIGS. 8A–8C highlight the differences between using $CF_4$ plasmas and $SF_6$ plasma, respectively. While the trends between the two sets of data are similar, the amount of relative etching changes depending upon the chemical etchant, which can be desirable in certain applications.

Figure 9:
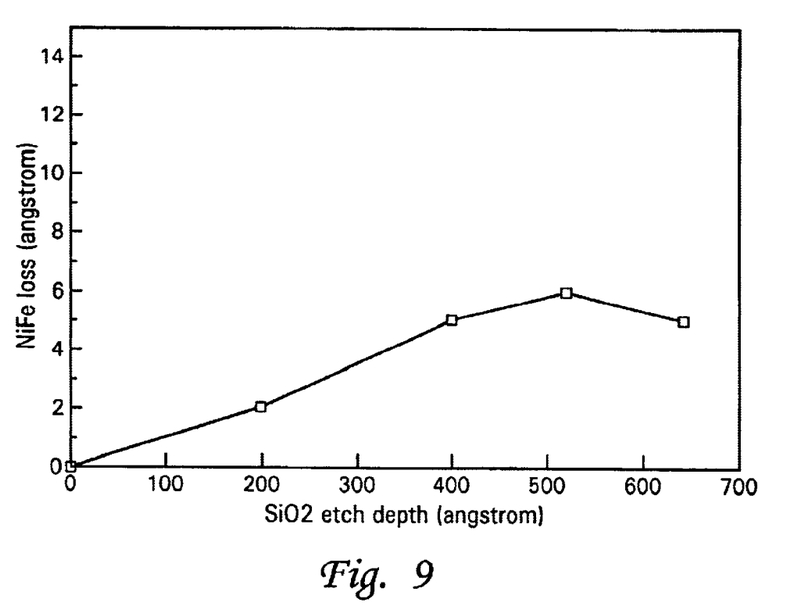
FIG. 9 is a graphical representation of data showing the effect of $SiO_2$ etch depth as a function of NiFe loss in a $CF_4$ plasma.

The RIE process is a selective etching process that does not etch the head elements to the same extent as other materials. Only a small amount of head element material is removed by the method of the invention, which is advantageous in the processing of the slider. The relationship between the metal (head element) etch rate and overcoat etch rate is shown with reference to data in FIG. 9, wherein RIE data is shown with a source power of 200 W, a bias power of 50, and a chamber pressure of 5 mtorr in a $CF_4$ plasma. While some NiFe head element material is lost during RIE, a much larger amount of $SiO_2$ overcoat material is removed. For example, when 6 Å of NiFe is removed, over 500 Å of $SiO_2$ is removed. These data show a high degree of selectivity for $SiO_2$ material relative to the metallic head elements. While these data exemplify the advantages and parameters of using RIE in the method of the invention, they are by no means limiting of the range in which the various parameters can be adjusted to effectuate a change in the topography of a slider, its ABS, and/or a trailing edge of a slider being formed from a substance such as $SiO_2$ that can be preferentially etched relative to the head and substrate materials.

The method of RIE to shape the topography of a slider has several advantages over the prior art. One major advantage of the method of the invention is the improvement of the thermal asperity (TA) sensitivity of the MR read head 51. A TA event occurs when the read sensor makes physical contact with the moving disk during operation. If the read head protrudes from the slider, then there is a greater likelihood that it will contact the disk. A TA event causes the resistance of the MR magnetic heads to change dramatically which degrades the head performance. Thus, it is desirable to decrease the exposure of the read head in order to decrease the TA. Altering the topography of the heads relative to the substrate can increase the stability of the read head and thus improve the read/write function of the slider head. The method of the present invention can selectively change the topography of the region around the magnetic recording heads to improve the TA sensitivity.

Another advantage to the present method is that it can be used in a batch process. A complete batch of sliders can be placed on the pallet, and the method carried out such that each slider trailing edge is exposed to the RIE process simultaneously.

Another advantage to the present invention is the selective nature of removing the $SiO_2$ overcoat from a row of sliders, thus changing the topography of the slider. Further, there is selective etching of the $SiO_2$ relative to the read elements.

Yet another advantage to the present invention is that in the RIE process there is no redeposition of the reacted $SiO_2$ and other materials since these materials are volatile ($SiO_2$—plasma reaction product) they can be drawn or pumped from the surface and reaction chamber.

Yet another advantage of the present invention is that by changing the four parameters of exposure time, bias power, source power and chamber pressure, the relative etch rate can be controlled to a high degree. Further, the amount of chemical etchant can also be altered.

While the invention has been particularly shown and described with reference to a preferred embodiment, it will be understood by those skilled in the art chat various changes in form and detail may be made therein without departing from the spirit and scope of the invention.

What is claimed is:

1. A method of altering the topography of sliders, each of the sliders having a substrate with an ABS surface, a trailing edge, and at least one magnetic recording head, the method comprising:

providing a wafer;

applying an undercoat of Al2O3 and an overcoat of SiO2 to the wafer;

slicing the wafer into rows of sliders; then lapping the rows of sliders;

generating a plasma using a chemical etchant selected from a group consisting of $CF_4$, $SF_6$, CHF3, C3F6, C4F8, and NF3, and an inert gas of Argon to form a total gas mixture, such that the chemical etchant comprises between about 50% and 100% of the total gas mixture;

holding the plasma within a chamber at a pressure between about 1 mtorr and 20 mtorr and subjecting the plasma to a source power of between about 50 W and 600 W to generate ions within the chamber;

placing the rows of sliders on an electrode to which a bias power of between about 0 W and 100 W is applied; and exposing the ABS surfaces and the trailing edges of the sliders to the plasma, such that the overcoat is selectively etched away relative to the substrates of the sliders and the magnetic recording heads.

* * * * *